United States Patent
Ito

(10) Patent No.: US 12,533,636 B2
(45) Date of Patent: Jan. 27, 2026

(54) HOLLOW FIBER MEMBRANE MODULE AND DEHUMIDIFIER/HUMIDIFIER

(71) Applicant: NOK CORPORATION, Tokyo (JP)

(72) Inventor: Yosuke Ito, Kikugawa (JP)

(73) Assignee: NOK CORPORATION, Tokyo (JP)

( * ) Notice: Subject to any disclaimer, the term of this patent is extended or adjusted under 35 U.S.C. 154(b) by 320 days.

(21) Appl. No.: 18/282,102

(22) PCT Filed: May 10, 2022

(86) PCT No.: PCT/JP2022/019827
§ 371 (c)(1),
(2) Date: Sep. 14, 2023

(87) PCT Pub. No.: WO2022/255039
PCT Pub. Date: Dec. 8, 2022

(65) Prior Publication Data
US 2024/0157301 A1  May 16, 2024

(30) Foreign Application Priority Data
Jun. 2, 2021 (JP) ................................. 2021-092741

(51) Int. Cl.
*B01D 63/02* (2006.01)
*B01D 53/26* (2006.01)
(Continued)

(52) U.S. Cl.
CPC .......... *B01D 63/02* (2013.01); *B01D 53/268* (2013.01); *H01M 8/04149* (2013.01);
(Continued)

(58) Field of Classification Search
CPC ................. B01D 63/02; B01D 53/268; B01D 2053/224; B01D 2257/80; B01D 2313/04;
(Continued)

(56) References Cited

U.S. PATENT DOCUMENTS 4,421,529 A * 12/1983 Revak ................. C01B 13/0255
96/8
5,403,273 A * 4/1995 Lindsay .............. A61M 1/3623
604/6.14
(Continued)

FOREIGN PATENT DOCUMENTS

CN 103298544 A * 9/2013 ............. B01D 65/00
CN 105636674 A * 6/2016 ............. B01D 65/08
(Continued)

*Primary Examiner* — Stephen Hobson
(74) *Attorney, Agent, or Firm* — Harness, Dickey & Pierce, P.L.C.

(57) ABSTRACT

A hollow fiber membrane module includes an inner case 120 with a one-end-side outer peripheral surface 121, the width of which is constant from one end side toward the other end side, and an other-end-side outer peripheral surface 122 which gradually widens from one end side toward the other end side, and in the inner case 120, a hollow portion that opens to the other end side is provided on an inside of the other-end-side outer peripheral surface 122 and a plurality of windows 122a that allow communication between the hollow portion and the annular gap are provided, and in the outer case 110, a communication hole 111a that communicates between the annular gap and the outside of the outer case 110 is provided at a position that is closer to the one end side.

5 Claims, 4 Drawing Sheets

(51) Int. Cl.
*H01M 8/04119* (2016.01)
*B01D 53/22* (2006.01)

(52) U.S. Cl.
CPC .... *B01D 2053/224* (2013.01); *B01D 2257/80* (2013.01); *B01D 2313/04* (2013.01); *B01D 2313/205* (2022.08)

(58) Field of Classification Search
CPC .......... B01D 2313/205; B01D 2313/08; B01D 2313/10; B01D 2313/12; B01D 63/022; B01D 53/228; B01D 53/265; H01M 8/04149; H01M 8/04; F24F 2003/1435; Y02E 60/50
See application file for complete search history.

(56) References Cited

U.S. PATENT DOCUMENTS

| | | | | |
|---|---|---|---|---|
| 5,837,033 | A * | 11/1998 | Giglia | B01D 63/10 |
| | | | | 96/10 |
| 6,183,639 | B1 * | 2/2001 | de Winter | B01D 63/04 |
| | | | | 210/321.89 |
| 8,449,659 | B2 * | 5/2013 | Taylor | B01D 19/0031 |
| | | | | 96/6 |
| 9,504,962 | B2 * | 11/2016 | Yamaoka | B01D 63/0233 |
| 2005/0121812 | A1 * | 6/2005 | Okada | B01D 63/02 |
| | | | | 261/104 |
| 2006/0147774 | A1 * | 7/2006 | Suzuki | H01M 8/04164 |
| | | | | 429/513 |
| 2012/0031831 | A1 * | 2/2012 | Kanougi | B01D 63/023 |
| | | | | 210/321.61 |
| 2012/0304856 | A1 * | 12/2012 | Kanetsuki | B01D 53/228 |
| | | | | 95/47 |
| 2016/0107126 | A1 * | 4/2016 | Cates | C02F 1/4695 |
| | | | | 210/636 |
| 2018/0185784 | A1 * | 7/2018 | Kodama | B01D 63/107 |
| 2018/0328006 | A1 * | 11/2018 | Lahuerta Romeo | E03B 5/045 |
| 2019/0151528 | A1 * | 5/2019 | Li | A61M 1/36 |
| 2024/0157302 | A1 * | 5/2024 | Ito | H01M 8/04149 |
| 2024/0173675 | A1 * | 5/2024 | Ito | B01D 63/022 |

FOREIGN PATENT DOCUMENTS

| | | | | |
|---|---|---|---|---|
| CN | 106532084 | B | * 3/2021 | ............. B01F 23/20 |
| CN | 116963822 | A | * 10/2023 | ........... B01D 63/022 |
| JP | 2002-147802 | A | 5/2002 | |
| JP | 2005-265196 | A | 9/2005 | |
| JP | 2007-212076 | A | 8/2007 | |
| JP | 2007-216175 | A | 8/2007 | |
| JP | 2011-141083 | A | 7/2011 | |
| WO | WO-2012077810 | A1 | * 6/2012 | ............. B01D 71/64 |
| WO | WO-2014077414 | A1 | * 5/2014 | ............. B01D 63/02 |

* cited by examiner

HOLLOW FIBER MEMBRANE MODULE AND DEHUMIDIFIER/HUMIDIFIER

CROSS-REFERENCE TO RELATED APPLICATIONS

This application is a National Stage of International Application No. PCT/JP2022/019827, filed May 10, 2022 (now WO 2022/255039A1), which claims priority to Japanese Application No. 2021-092741, filed Jun. 2, 2021. The entire disclosures of each of the above applications are incorporated herein by reference.

FIELD

The present disclosure relates to a hollow fiber membrane module and a dehumidifier/humidifier.

BACKGROUND

Hollow fiber membrane modules provided in humidifiers for fuel cells are required to have improved humidification performance, a reduced pressure loss, and a reduced size. Therefore, there is a known technique for satisfying these requirements by configuring a case of a hollow fiber membrane module to be a double case. A hollow fiber membrane module according to such a conventional example will be described with reference to FIG. 4. FIG. 4 is a schematic cross-sectional view of the hollow fiber membrane module according to the conventional example.

An illustrated hollow fiber membrane module 500 includes a cylindrical outer case 510, an inner case 520 that is arranged inside the outer case 510, and a plurality of hollow fiber membranes 530 provided in an annular gap between the outer case 510 and the inner case 520. In addition, the hollow fiber membrane module 500 includes a pair of sealing fixing portions 541 and 542. These sealing fixing portions 541 and 542 seal the annular gap on one end side and the other end side of the outer case 510 and the inner case 520 in a state in which the hollow interiors of the hollow fiber membranes 530 are open, and have a role of fixing the plurality of hollow fiber membranes 530 to the outer case 510 and the inner case 520.

In addition, in the outer case 510, a communication hole 511 that communicates between the annular gap and the outside of the outer case 510 is provided at a position that is closer to one end side. In addition, a partition wall 521 is provided inside the inner case 520, and a plurality of windows 522 that allow communication between the hollow portion inside the inner case 520 and the annular gap are provided closer to the other end side than the partition wall 521.

For the hollow fiber membrane module 500 configured as described above, a wet gas is supplied to the hollow portion inside the inner case 520, and a dry gas is supplied to the hollow interior of each hollow fiber membrane 530 from the sealing fixing portion 541 side. Thereby, in the drawing, as indicated by solid arrows, the wet gas enters the annular gap through the plurality of windows 522, passes through the outside of the hollow fiber membrane 530, and flows from the communication hole 511 to the outside of the outer case 510. In addition, the dry gas flows through the inside of the hollow fiber membrane 530 from the sealing fixing portion 541 on one end side toward the sealing fixing portion 542 on the other end side. Accordingly, water in the wet gas moves toward the dry gas due to a membrane separation action of the hollow fiber membrane 530, and the dry gas is humidified.

In the case of a general hollow fiber membrane module, a plurality of hollow fiber membranes are provided in a single cylindrical case, and the case has a configuration in which an inlet and an outlet for a wet gas are provided, and thus the hollow fiber membranes arranged near the center of the case tend not to contribute much to the membrane separation action. On the other hand, in the case of the hollow fiber membrane module 500 according to the conventional example shown in FIG. 4, since all of the plurality of hollow fiber membranes 530 can contribute to the membrane separation action, it is possible to satisfy the above requirements.

However, even in the case of the hollow fiber membrane module 500, there is still room for improvement, such as the high proportion of the volume of the inner case 520 with respect to the inside of the outer case 510, and the pressure loss which cannot always be reduced sufficiently.

CITATION LIST

Patent Literature

[PTL 1] Japanese Patent Application Publication No. 2002-147802
[PTL 2] Japanese Patent Application Publication No. 2005-265196

SUMMARY

Technical Problem

An object of the present disclosure is to provide a hollow fiber membrane module and a dehumidifier/humidifier that can reduce the pressure loss and improve the dehumidification/humidification performance.

Solution to Problem

In order to address the above problem, the present disclosure provides the following solutions.

A hollow fiber membrane module of the present disclosure including: a cylindrical outer case; an inner case that is arranged inside the outer case; a plurality of hollow fiber membranes that are provided in an annular gap between the outer case and the inner case; and a pair of sealing fixing portions that seal the annular gap on one end side and the other end side of the outer case and the inner case respectively in a state in which hollow interiors of the hollow fiber membranes are open, and fix the plurality of hollow fiber membranes to the outer case and the inner case, wherein an outer peripheral surface of the inner case includes a one-end-side outer peripheral surface, the width of which in a direction perpendicular to a direction from the one end side to the other end side is constant from the one end side toward the other end side, and an other-end-side outer peripheral surface which is provided closer to the other end side than the one-end-side outer peripheral surface and the width of which gradually widens from the one end side toward the other end side, wherein, in the inner case, a hollow portion that opens to the other end side is provided on an inside of the other-end-side outer peripheral surface, and a plurality of windows that allow communication between the hollow portion and the annular gap are provided, and wherein, in the outer case, a communication hole that communicates between the annular gap and the outside of the outer case is provided at a position that is closer to the one end side.

According to the present disclosure, in the annular gap between the outer case and the inner case, it becomes easier to secure a space outside the one-end-side outer peripheral surface and it is possible to minimize an increase in the filling rate of the hollow fiber membrane, and thus it is possible to reduce the pressure loss. In addition, since a plurality of windows are provided on the other-end-side outer peripheral surface of which the width gradually widens from the one end side toward the other end side, in the vicinity of where these windows are provided, a fluid that passes through the outside of the hollow fiber membrane and a fluid that passes through the hollow interior of the hollow fiber membrane can easily flow in opposite directions. Thereby, it is possible to improve the dehumidification/humidification performance.

An other-end-side inner peripheral surface formed with the hollow portion on the inside of the other-end-side outer peripheral surface may be configured such that the width gradually widens from the one end side toward the other end side.

Thereby, in the vicinity of where the window is provided, a fluid that passes through the outside of the hollow fiber membrane and a fluid that passes through the hollow interior of the hollow fiber membrane can more easily flow in opposite directions.

The one-end-side outer peripheral surface may be a columnar surface.

The other-end-side outer peripheral surface may be a tapered surface.

In addition, a dehumidifier/humidifier of the present disclosure includes: the hollow fiber membrane module; a wet gas supply device that supplies a wet gas to the hollow portion; and a dry gas supply device that supplies a dry gas having a lower humidity than the wet gas to hollow interiors of the plurality of hollow fiber membranes from the sealing fixing portion on the one end side.

Here, the above configurations can be used in combination where possible.

Advantageous Effects of the Disclosure

As described above, according to the present disclosure, it is possible to reduce the pressure loss and improve the dehumidification/humidification performance.

DETAILED DESCRIPTION

Forms for implementing the present disclosure will be exemplified below in detail based on examples with reference to the drawings. However, sizes, materials, shapes, and relative arrangements of components described in the examples are not intended to limit the scope of the disclosure unless otherwise specified.

Example

Figure 1:
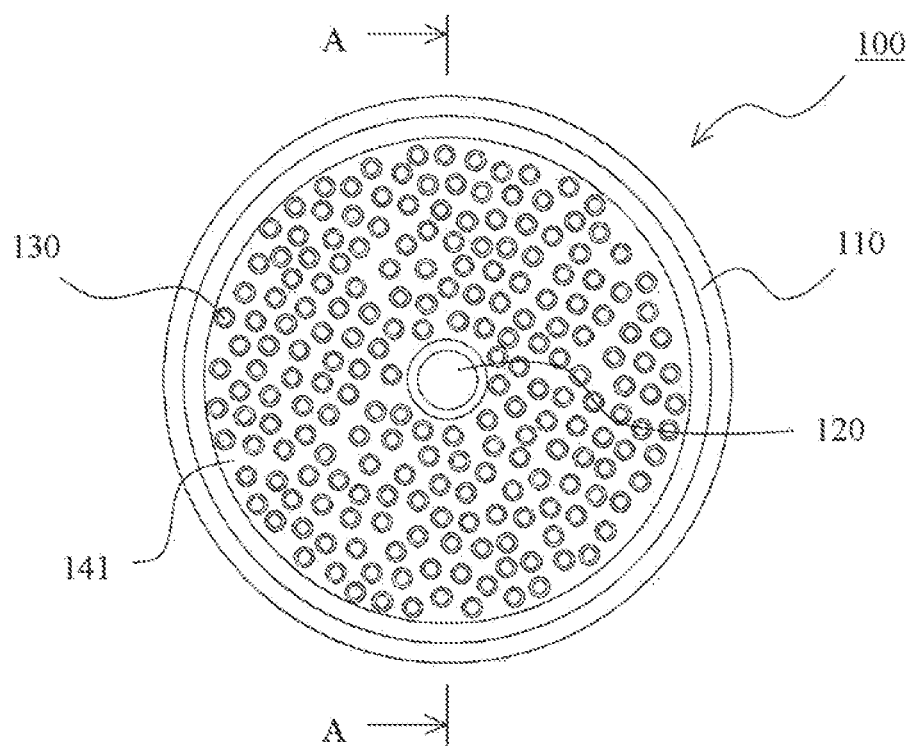
FIG. 1 is a plan view of a hollow fiber membrane module according to an example of the present disclosure.
Figure 2:
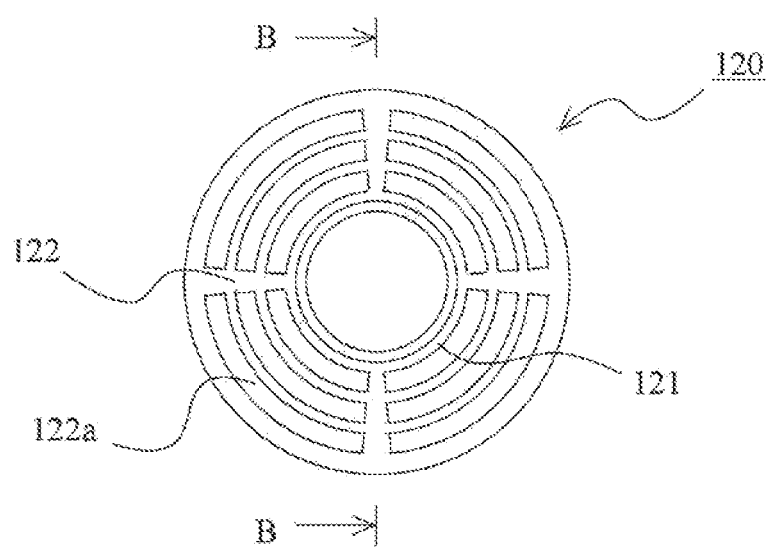
FIG. 2 is a plan view of an inner case according to the example of the present disclosure.
Figure 3:
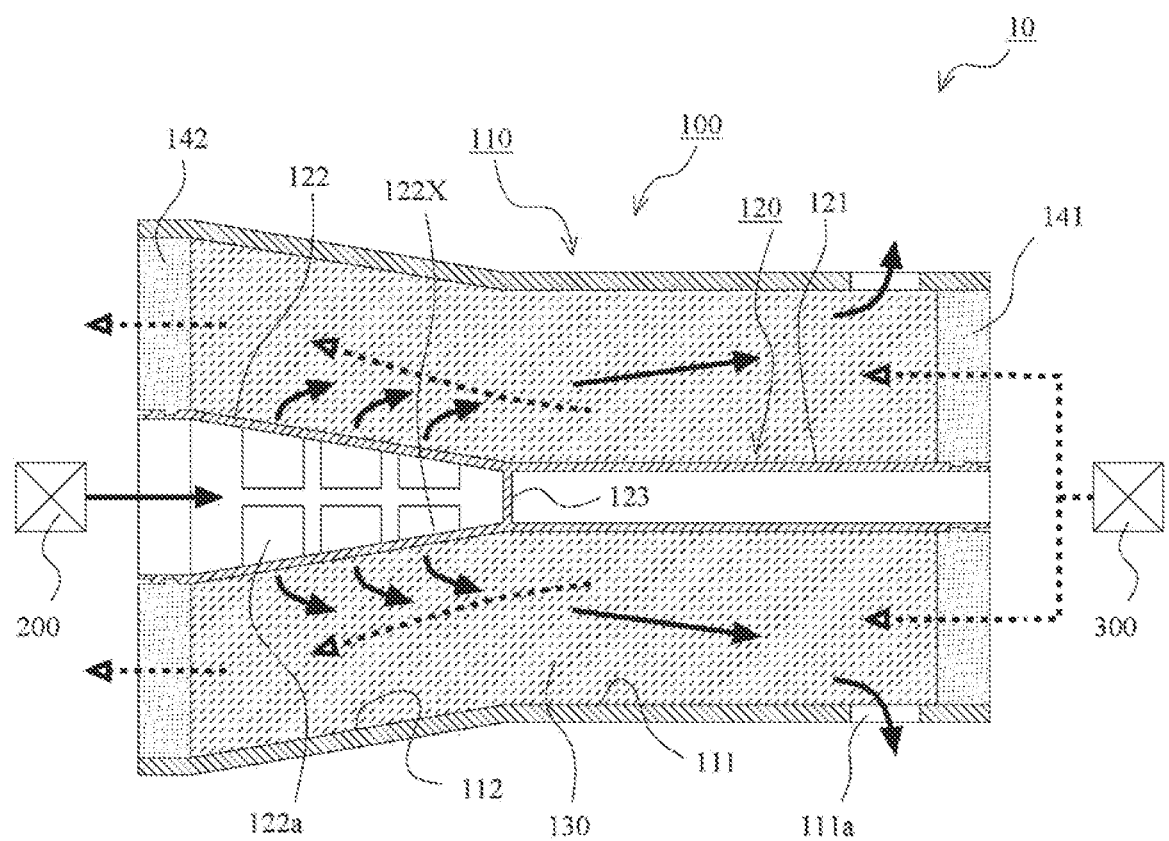
FIG. 3 is a schematic configuration diagram of a dehumidifier/humidifier according to an example of the present disclosure.
Figure 4:
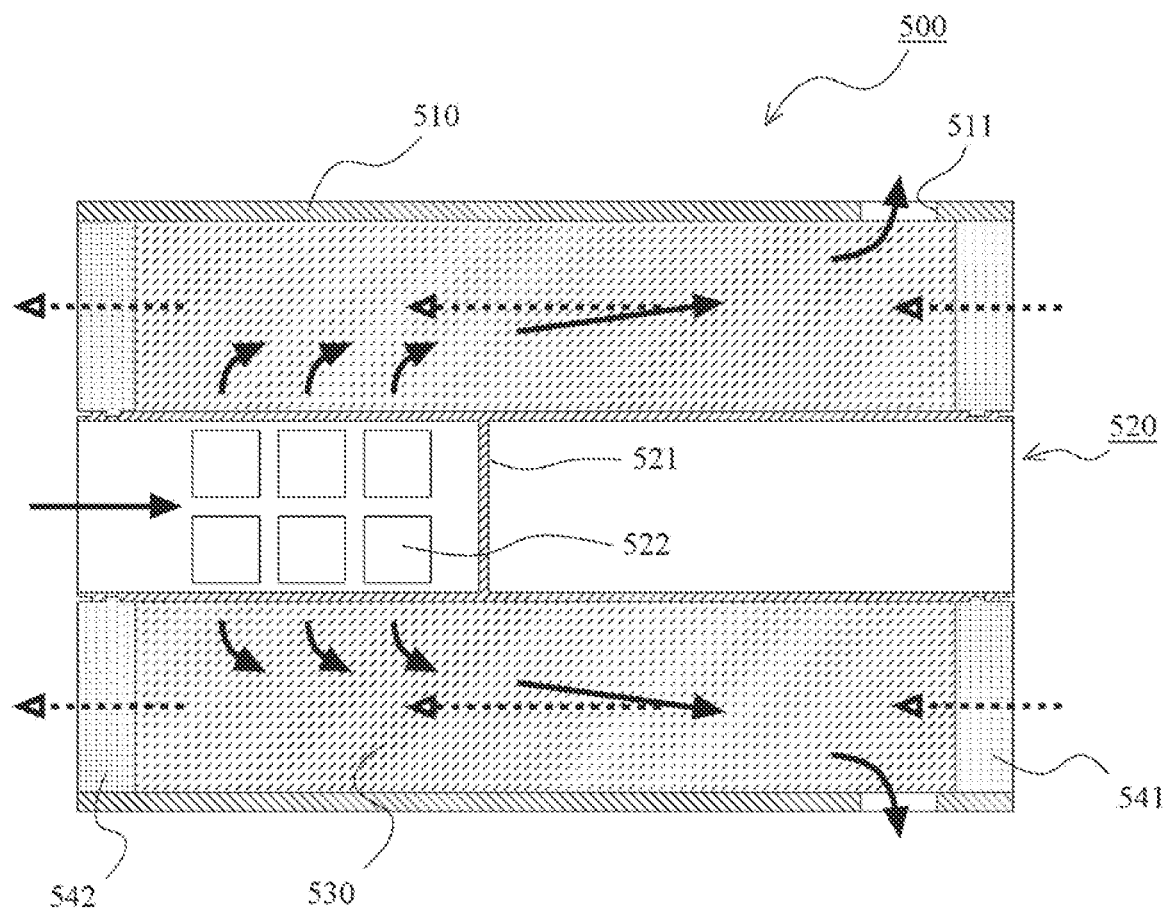
FIG. 4 is a schematic cross-sectional view of a hollow fiber membrane module according to a conventional example.

A hollow fiber membrane module and a dehumidifier/humidifier according to examples of the present disclosure will be described with reference to FIG. 1 to FIG. 3. FIG. 1 is a plan view of a hollow fiber membrane module according to an example of the present disclosure. FIG. 2 is a plan view of an inner case of the example according to the present disclosure. FIG. 3 is a schematic configuration diagram of a dehumidifier/humidifier according to an example of the present disclosure. Here, FIG. 3 shows a schematic cross-sectional view of the hollow fiber membrane module. The cross-sectional view of the hollow fiber membrane module corresponds to the AA cross-sectional view in FIG. 1, and the cross-sectional view of the inner case provided in the hollow fiber membrane module corresponds to the BB cross-sectional view in FIG. 2.

<Dehumidifier/Humidifier>

A dehumidifier/humidifier 10 according to this example includes a hollow fiber membrane module 100, a wet gas supply device 200, and a dry gas supply device 300. The wet gas supply device 200 is configured to supply a wet gas to the outside of a hollow fiber membrane 130 provided in the hollow fiber membrane module 100. In addition, the dry gas supply device 300 is configured to supply a dry gas having a lower humidity than the wet gas to the hollow interiors of the plurality of hollow fiber membranes 130. Accordingly, due to the membrane separation action of the hollow fiber membrane 130, water in the wet gas moves toward the dry gas. Therefore, since the dry gas is humidified and the wet gas is dehumidified, the device can be used as both a humidifier and a dehumidifier. Here, the dehumidifier/humidifier 10 according to this example can be suitably used as a humidifier for humidifying an electrolyte membrane provided in a fuel cell. In this case, wet air generated in the fuel cell is used as the wet gas. Then, the humidified gas (air) is supplied to the electrolyte membrane provided in the fuel cell, and thus the electrolyte membrane is kept wet. Here, as the material of the hollow fiber membrane 130, for example, polyphenylsulfone (PPSU) having a property of transmitting water according to a capillary condensation mechanism by controlling the pore size can be suitably used. Here, when a membrane-forming solution (a raw material of the hollow fiber membrane) is prepared, a hollow fiber membrane having hydrophilicity can be obtained by performing spinning using a membrane-forming solution in which PPSU and a hydrophilic polymer (polyvinylpyrrolidone) are added to a solvent. In addition, Nafion (registered trademark), which is a hydrophilic material having a property of transmitting water by dissolution and diffusion, can be used. Since the materials described above have poor elutability and have high strength, they can be suitably used for the dehumidifier/humidifier 10.

<Hollow Fiber Membrane Module>

The hollow fiber membrane module 100 according to this example will be described in more detail. The hollow fiber membrane module 100 includes a cylindrical outer case 110, an inner case 120 that is arranged inside the outer case 110, and a plurality of hollow fiber membranes 130 provided in an annular gap between the outer case 110 and the inner case 120. In addition, the hollow fiber membrane module 100 includes a pair of sealing fixing portions 141 and 142. These sealing fixing portions 141 and 142 seal the annular gap on one end side (the right side in FIG. 3) and the other end side (the left side in FIG. 3) of the outer case 110 and the inner case 120 in a state, in which the hollow interiors of the hollow fiber membranes 130 are open, and have a role of fixing the plurality of hollow fiber membranes 130 to the outer case 110 and the inner case 120. These sealing fixing portions 141 and 142 are obtained by curing a potting material such as an epoxy resin. Here, for convenience, hereinafter, in the hollow fiber membrane module 100, in FIG. 3, the right side will be referred to as "one end side" and the left side will be referred to as "other end side."

The outer peripheral surface of the inner case 120 according to this example includes a one-end-side outer peripheral surface 121 and an other-end-side outer peripheral surface 122. The one-end-side outer peripheral surface 121 is configured such that the width in the direction perpendicular to the direction from the one end side to the other end side is constant from the one end side toward the other end side. In this example, the one-end-side outer peripheral surface 121 is configured as a columnar surface. However, as the one-end-side outer peripheral surface in the present disclosure, other surfaces (for example, a prismatic surface) can also be used as long as the width in the direction perpendicular to the direction from the one end side to the other end side is constant from the one end side toward the other end side.

In addition, the other-end-side outer peripheral surface 122 is provided closer to the other end side than the one-end-side outer peripheral surface 121 and is configured such that the width in the direction perpendicular to the direction from the one end side to the other end side gradually widens from the one end side toward the other end side. In this example, the other-end-side outer peripheral surface 122 is configured as a tapered surface (a surface having a straight cross-sectional shape cut along a plane including the central axis). However, as the other-end-side outer peripheral surface in the present disclosure, surfaces having other shapes can be used as long as the width in the direction perpendicular to the direction from the one end side to the other end side gradually widens from the one end side toward the other end side. For example, a curved surface having a curved cross-sectional shape cut along a plane including the central axis, a pyramidal surface or the like can be used.

The outer case 110 includes a columnar inner peripheral surface 111 provided concentrically with the one-end-side outer peripheral surface 121 and a tapered inner peripheral surface 112 provided concentrically with the other-end-side outer peripheral surface 122 in the inner case 120. However, the shape of the inner peripheral surface of the outer case 110 is not particularly limited, and various shapes can be used. In addition, the shape of the outer peripheral surface of the outer case 110 is not limited to the illustrated example, and various shapes can be used.

In addition, in the inner case 120, a partition wall 123 is provided. Accordingly, a hollow portion that opens to the one end side and a hollow portion that opens to the other end side are formed on the inside of the one-end-side outer peripheral surface 121 and on the inside of the other-end-side outer peripheral surface 122. However, it is not always necessary to provide the hollow portion on the one end side. In addition, in the inner case 120, a plurality of windows 122*a* that allow communication between the hollow portion inside the other-end-side outer peripheral surface 122 and the annular gap (annular gap between the outer case 110 and the inner case 120) are provided. In addition, similarly to the other-end-side outer peripheral surface 122, an other-end-side inner peripheral surface 122X formed with the hollow portion inside the other-end-side outer peripheral surface 122 is configured such that the width in the direction perpendicular to the direction from the one end side to the other end side gradually widens from the one end side toward the other end side. In this example, the other-end-side inner peripheral surface 122X is configured as a tapered surface. However, similarly to the other-end-side outer peripheral surface 122, as the other-end-side inner peripheral surface 122X, surfaces having other shapes can be used as long as the width in the direction perpendicular to the direction from the one end side to the other end side gradually widens from the one end side toward the other end side.

In addition, in the outer case 110, a communication hole 111*a* that communicates between the annular gap and the outside of the outer case 110 is provided at a position that is biased toward the one end side. The number of communication holes 111*a* is not particularly limited, but it is desirable to provide a plurality of communication holes at intervals in the circumferential direction.

In the hollow fiber membrane module 100 configured as described above, the wet gas supply device 200 supplies a wet gas to the hollow portion inside the other-end-side outer peripheral surface 122 in the inner case 120. In addition, the dry gas supply device 300 supplies a dry gas to the hollow interiors of the hollow fiber membranes 130 from the side of the sealing fixing portion 141. Thereby, in the drawing, as indicated by solid arrows, the wet gas enters the annular gap through the plurality of windows 122*a*, passes through the outside of the hollow fiber membrane 130, and flows from the communication hole 111*a* to the outside of the outer case 110. In addition, the dry gas flows through the inside of the hollow fiber membrane 130 from the sealing fixing portion 141 on the one end side toward the sealing fixing portion 142 on the other end side. Accordingly, water in the wet gas moves toward the dry gas due to a membrane separation action of the hollow fiber membrane 130, the dry gas is humidified, and the wet gas is dehumidified.

<Advantages of Hollow Fiber Membrane Module and Dehumidifier/Humidifier According to this Example>

According to this example, in this configuration, a wet gas flows from the plurality of windows 122*a* provided in the inner case 120 to the communication hole 111*a* provided in the outer case 110. Therefore, all of the plurality of hollow fiber membranes 130 provided in the annular gap between the inner case 120 and the outer case 110 can contribute to the membrane separation action. Therefore, in this example, separately from the other-end-side outer peripheral surface 122 in which a wet gas is supplied to the inner hollow portion, the outer peripheral surface of the inner case 120 has a configuration including the one-end-side outer peripheral surface 121 configured such that the width is constant from the one end side toward the other end side. Accordingly, in the annular gap between the outer case 110 and the inner case 120, it becomes easier to secure a space outside the one-end-side outer peripheral surface 121 and it is possible to minimize an increase in the filling rate of the hollow fiber membrane 130. Therefore, it is possible to reduce the pressure loss. In addition, a configuration in which a plurality of windows 122*a* are provided on the other-end-side outer peripheral surface 122 of which the width gradually widens from the one end side toward the other end side is used. Therefore, in the vicinity of where these windows 122*a* are provided, a wet gas that passes through the outside of the hollow fiber membrane 130 and a dry gas that passes through the hollow interior of the hollow fiber membrane 130 can easily flow in opposite directions. Thereby, it is possible to improve dehumidification/humidification performance. In addition, in this example, the other-end-side inner peripheral surface 122X formed with the hollow portion inside the other-end-side outer peripheral surface 122 is configured such that the width gradually widens from the one end side toward the other end side. Thereby, in the vicinity of where the window 122a is provided, a wet gas that passes through the outside of the hollow fiber membrane 130 and a dry gas that passes through the hollow interior of the hollow fiber membrane 130 can more easily flow in opposite directions.

REFERENCE SIGNS LIST

10 Dehumidifier/humidifier
100 Hollow fiber membrane module
110 Outer case
111 Inner peripheral surface
111a Communication hole
112 Inner peripheral surface
120 Inner case
121 One-end-side outer peripheral surface
122 Other-end-side outer peripheral surface
122a Window
123 Partition wall
130 Hollow fiber membrane
141, 142 Sealing fixing portion
200 Wet gas supply device
300 Dry gas supply device

The invention claimed is:

1. A hollow fiber membrane module, comprising:
a cylindrical outer case;
an inner case that is arranged inside the outer case;
a plurality of hollow fiber membranes that are provided in an annular gap between the outer case and the inner case; and
a pair of sealing fixing portions that seal the annular gap on one end side and an other end side of the outer case and the inner case respectively in a state in which hollow interiors of the hollow fiber membranes are open, and fix the plurality of hollow fiber membranes to the outer case and the inner case,
wherein an outer peripheral surface of the inner case includes a one-end-side outer peripheral surface, the width of which in a direction perpendicular to a direction from the one end side to the other end side is constant from the one end side toward the other end side, and
an other-end-side outer peripheral surface which is provided closer to the other end side than the one-end-side outer peripheral surface and the width of which gradually widens from the one end side toward the other end side,
wherein, in the inner case, a hollow portion that opens to the other end side is provided on an inside of the other-end-side outer peripheral surface, and a plurality of windows that allow communication between the hollow portion and the annular gap are provided, and
wherein, in the outer case, a communication hole that communicates between the annular gap and the outside of the outer case is provided at a position that is closer to the one end side.

2. The hollow fiber membrane module according to claim 1, wherein an other-end-side inner peripheral surface formed with the hollow portion on the inside of the other-end-side outer peripheral surface is configured such that the width gradually widens from the one end side toward the other end side.

3. The hollow fiber membrane module according to claim 1, wherein the one-end-side outer peripheral surface is a columnar surface.

4. The hollow fiber membrane module according to claim 1, wherein the other-end-side outer peripheral surface is a tapered surface.

5. A dehumidifier/humidifier, comprising:
the hollow fiber membrane module according to claim 1;
a wet gas supply device that supplies a wet gas to the hollow portion; and
a dry gas supply device that supplies a dry gas, having a lower humidity than the wet gas, to hollow interiors of the plurality of hollow fiber membranes from the sealing fixing portion on the one end side.

* * * * *